United States Patent [19]
Ellermann et al.

[11] Patent Number: 4,652,146
[45] Date of Patent: Mar. 24, 1987

[54] GIBS FOR ELEVATOR GUIDE SHOES

[75] Inventors: Horst Ellermann, Vienna; Walter Krumboeck, Sankt Pölten, both of Austria

[73] Assignee: Otis Elevator Company, Farmington, Conn.

[21] Appl. No.: 840,358

[22] Filed: Mar. 17, 1986

[51] Int. Cl.$^4$ .......................... B66B 7/02; F16C 29/02
[52] U.S. Cl. ........................................ 384/33; 384/39; 187/95
[58] Field of Search .................. 384/7, 26, 33, 37, 38, 384/39, 42; 187/95; 104/119

[56] References Cited

U.S. PATENT DOCUMENTS

| | | | |
|---|---|---|---|
| 1,907,966 | 4/1931 | Henry | 384/33 |
| 2,045,620 | 6/1936 | Spullies | 384/39 |
| 2,226,770 | 12/1940 | Holter | 384/39 |
| 4,271,932 | 6/1981 | Klein | 384/33 X |
| 4,598,798 | 7/1986 | Koppensteiner | 384/33 X |

*Primary Examiner*—John M. Jillions
*Assistant Examiner*—David Werner
*Attorney, Agent, or Firm*—Gerald E. Linden

[57] ABSTRACT

A two piece (gib), U-shaped sliding shoe is disclosed. One gib (30) includes a first long flat plastic member (33) of length L, having an inside surface (34), an outside surface (36), an upper edge (38), a lower edge (40), a front edge (42), a back edge (44), a first flat rectangular tab (46) of length L1 and width W1 attached to the back edge (44) of the first member (33) in line with the top edge (38) of the first member (33) and extending perpendicularly inward away from the inside surface (34) of the first member (33), a second flat rectangular tab (48) of length L2 and width W2 attached to the back edge (44) of the first member (33) in line with the bottom edge (40) of the member (33) and extending perpendicularly inward away from the inside surface (34) of the first member (33). The other gib (32) includes a second long flat plastic member (52) of length L, having an inside surface (54), an outside surface (56), an upper edge (58), a lower edge (60), a front edge (62), a back edge (64), and including a third long flat plastic member (66) of length L3 and width W3 attached to the back edge (64) of the second member (52) and extending perpendicularly inward away from the inside surface (54) of the second member (52).

3 Claims, 3 Drawing Figures

4,652,146

GIBS FOR ELEVATOR GUIDE SHOES

BACKGROUND OF THE INVENTION

One technique for guiding an elevator in a shaft is to mount a sliding shoe assembly to the elevator car and to mount a corresponding guiderail in the hoistway. One prior art shoe assembly uses a plastic U-shaped gib in sliding contact with the rail. Backlash of such gibs typically ranges from 0.6 mm, when new, up to 4.0 mm, when worn. Backlash is inversely proportional to riding comfort. Another prior art shoe uses three plastic gibs, arranged in a U-shape, and pegged on their outside (the side away from the rail) to a mounting bracket. The backlash problems are the same as for the unitary U-shaped gib, plus replacement of the gibs requires complete disassembly from an associated bracket due to the peg-retention feature.

DISCLOSURE OF THE INVENTION

Therefore, it is an object of this invention to provide gibs for guide shoes that minimize backlash, therefore providing riding comfort commensurable with a roller guide arrangement.

According to the invention, a first gib includes a two piece (gib), U-shaped sliding shoe is disclosed. One gib includes a first long flat plastic member of length L, having an inside surface an outside surface, an upper edge, a lower edge, a front edge, a back edge, a first flat rectangular tab of length L1 and width W1 attached to the back edge of the first member in line with the top edge of the first member and extending perpendicularly inward away from the inside surface of the first member, a second flat rectangular tab of length L2 and width W2 attached to the back edge of the first member in line with the bottom edge of the member and extending perpendicularly inward away from the inside surface of the first member. The other gib includes a second long flat plastic member of length L, having an inside surface, an outside surface, an upper edge, a lower edge, a front edge, a back edge, and including a third long flat plastic member of length L3 and width W3 attached to the back edge of the second member and extending perpendicularly inward away from the inside surface of the second member.

The third member is shorter than the second member and extends substantially to within a distance L1 of the upper edge of the second member and to within a distance L2 of the lower edge of the second member; so that the tabs 48) tuck just underneath the back edge of the second member, and the third member tucks just underneath the back edge of the first member.

Other objects, features, and advantages of the invention will become apparent in light of the following description thereof.

BEST MODE FOR CARRYING OUT THE INVENTION

Figure 1:
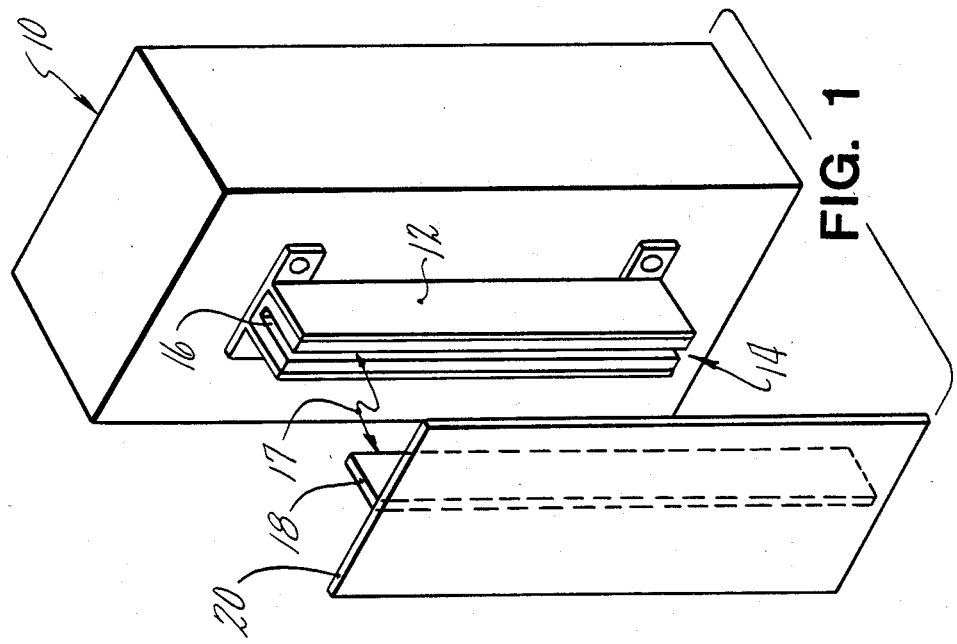
FIG. 1 is a perspective view of a generic guide shoe arrangement for an elevator.

FIG. 1 shows an elevator car 10 to which is mounted a generally U-shaped metal bracket 12 that presents a vertically-aligned channel 14. Disposed within the channel 14 is a U-shaped plastic gib 16. The outside dimension (disregarding length) of the gib 16 is sized for a snug fit within the bracket 12, and the inside dimension of the gib 16, which also forms a vertically-aligned channel is sized for a close sliding fit (indicated by the arrow 17) over a guiderail 18 which is disposed vertically in the hoistway 20.

Figure 2:
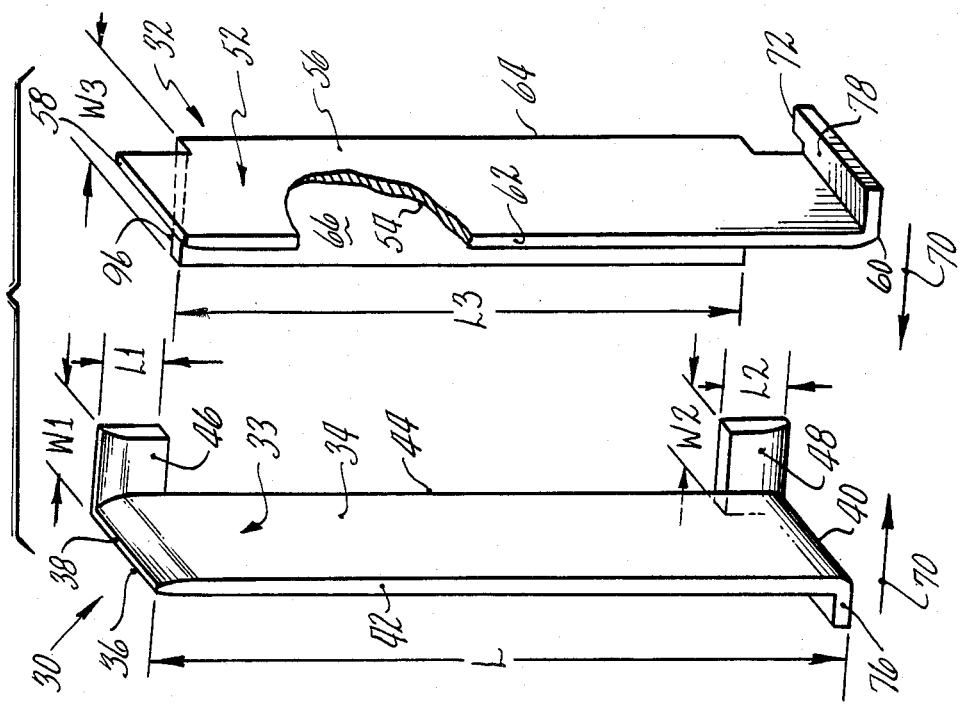
FIG. 2 is an exploded perspective view of the gibs of this invention.

FIG. 2 shows the gibs of this invention. A first gib 30 establishes one side of a U-shaped sliding shoe for insertion into a U-shaped bracket similar to the bracket 12, and a second gib 32 establishes the other side and the central (bight) portion of the U-shaped sliding shoe.

The gib 30 is essentially a long flat plastic member 33, of length L, having an inside surface 34, an outside surface 36, an upper edge 38, a lower edge 40, a front edge 42, and a back edge 44.

A flat rectangular tab 46, of length L1 and width W1, is attached to the back edge 44 of the member 33 in line with the top edge 38, and extends perpendicularly "inward" away from the inside surface 34. A similar tab 48, of length L2 and width W2, is attached to the back edge 44 of the member 33 in line with the bottom edge 40, and extends perpendicularly inward away from the inside surface 34 (L2 may equal L1, and W2 may equal W1).

The gib 32 includes a long flat plastic member 52, of length L, having an inside surface 54, an outside surface 56, an upper edge 58, a lower edge 60, a front edge 62 and a back edge 64. A long flat plastic member 66, of length L3 and width W3, is attached to the back edge 64 of the member 52 and extends perpendicularly inward away from the inside surface 54. The member 66 is shorter than the member 52 and extends to within a distance L1 and L2, respectively, of the upper and lower edges 58 and 60 of the member 52.

When the gibs 30 and 32 are brought together, as indicated by the arrows 70, the tabs 46 and 48 tuck just underneath the back edge 64 of the member 52, and the member 66 tucks just underneath the back edge 44 of the member 33, between the tabs 46 and 48. Further approach of the two gibs 30 and 32 is prevented by a stop 72 provided on the gib 32 in a manner described hereinafter.

Figure 3:
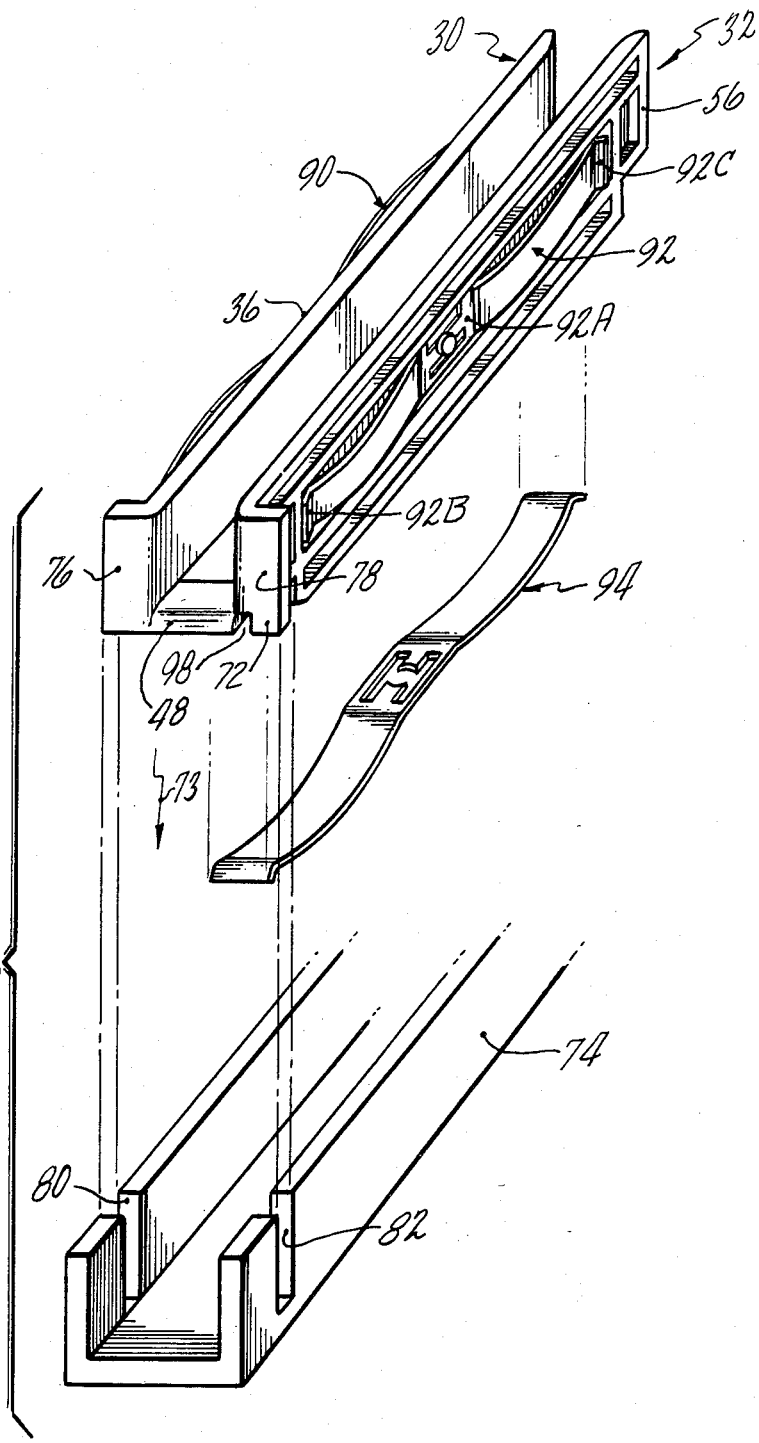
FIG. 3 is an assembled perspective view of the gibs of this invention, assembled in a bracket.

FIG. 3 shows the gibs 30 and 32 assembled for insertion (as indicated by an arrow 73) into a U-shaped bracket 74. It will be appreciated from this drawing that rectangular tabs 76, 78 disposed at the bottom edges 40, 60 of the gibs 30, 32, and extending perpendicularly outwardly therefrom, cooperate with slots 80, 82 in the bracket 74 to restrain the gibs from longitudinal movement within the bracket, which is mounted to the elevator car as shown in FIG. 1.

The gib 30, including the member 33, and tabs 46, 48, and 76 is, molded and machined from a single plastic piece, such as nylon, polyurethane, or polyethelene.

Similarly the gib 32, including the members 52, 66 and tab 78 is similarly molded and machined from a single plastic piece.

In order to minimize backlash as the gibs wear, leaf springs 90 and 92 are mounted to the outside surfaces 36, 56 of the gibs 30, 32. Close inspection reveals that the leaf springs are double-arcuate, connected at their arc-intersecting points (e.g. 92A) to approximately the midpoint of the respective gib surface, and concave towards the respective gib surface so that their free ends 92B and 92C contact the respective gib surface. A similar leaf spring 94 is similarly attached to the outside surface 96 of the element 66. The leaf springs assure intimate sliding contact between the gibs and the guide rail.

The aforementioned stop 72 is an extension of the tab 78 that projects sufficiently below the back edge 64 of the element 52 to limit, by contact with the tab 48 of the gib 30, closure of the gibs 30, 32 upon one another. It will be readily appreciated that the stop 72 and tab 48 dimensions must be established so that there is a clearance (gap) 98 therebetween when new gibs are installed. As the gibs wear, the gap 98 decreases. A service limit for gib thickness is indicated by complete closure of the gap 98.

We claim:

1. A sliding shoe assembly (16) for cooperating with an elevator guide rail (18), comprising:
   a U-shaped bracket (74) mounted vertically to an elevator car (10);
   a first gib (30) including a first long flat plastic member (33) of length L, having an inside surface (34), an outside surface (36), an upper edge (38), a lower edge (40), a front edge (42), a back edge (44), a first flat rectangular tab (46) of length L1 and width W1 attached to the back edge (44) of the first member (33) in line with the top edge (38) of the first member (33) and extending perpendicularly inward away from the inside surface (34) of the first member (33), a second flat rectangular tab (48) of length L2 and width W2 attached to the back edge (44) of the first member (33) in line with the bottom edge (40) of the first member (33) and extending perpendicularly inward away from the inside surface (34) of the first member (33);
   a second gib (32) including a second long flat plastic member (52) of length L, having an inside surface (54), an outside surface (56), an upper edge (58), a lower edge (60), a front edge (62), a back edge (64), and including a third long flat plastic member (66) of length L3 and width W3 attached to the back edge (64) of the second member (52) and extending perpendicularly inward away from the inside surface (54) of the second member (52);
   wherein the third member (66) is shorter than the second member (52) and extends substantially to within a distance L1 of the upper edge (58) of the second member (52) and to within a distance L2 of the lower edge (60) of the second member (52);
   wherein the inside surfaces (34, 54) of the first and second members (33, 52) face each other;
   wherein the gibs (30, 32) are juxtaposed so that the tabs (46, 48) tuck just underneath the back edge (64) of the second member (52), and the third member (66) tucks just underneath the back edge (44) of the first member; and
   wherein the juxtaposition of the gibs (30, 32) forms a U-shaped sliding shoe that fits within the U-shaped bracket (74).

2. A sliding shoe assembly according to claim 1, further comprising:
   a third rectangular tab (76) disposed at the bottom edge (40) of the first member (33) and extending perpendicularly outwardly therefrom;
   a fourth rectangular tab (78) disposed at the bottom edge (60) of the second member (52) and extending perpendicularly outwardly therefrom;
   slots (80, 82) in the bracket (74);
   wherein the third and fourth tabs (76, 78) cooperate with the slots (80, 82) to restrain the gibs (30, 32) from longitudinal movement within the bracket (74).

3. A sliding shoe assembly according to claim 1, further comprising:
   a first leaf spring (90) mounted to the outside surface (36) of the first member (33);
   a second leaf spring (92) mounted to the outside surface (56) of the second member (52); and
   a third leaf spring (94) mounted to the outside surface (96) of the third member (66);
   wherein the leaf springs assure intimate sliding contact between the gibs (32, 32) and the guide rail (18).

* * * * *